(12) United States Patent
Breckenridge

(10) Patent No.: US 7,113,585 B1
(45) Date of Patent: Sep. 26, 2006

(54) METHOD AND APPARATUS FOR AN INTELLIGENT TELEPHONE PREFIX DIALER

(76) Inventor: John L. Breckenridge, 2940 E. Colfax Ave., #400, Denver, CO (US) 80206

(*) Notice: Subject to any disclaimer, the term of this patent is extended or adjusted under 35 U.S.C. 154(b) by 0 days.

(21) Appl. No.: 09/525,566

(22) Filed: Mar. 15, 2000

(51) Int. Cl.
H04M 1/00 (2006.01)
H04M 3/00 (2006.01)

(52) U.S. Cl. ............ 379/356.01; 379/355.05; 379/355.07; 379/355.08; 455/564

(58) Field of Classification Search .......... 379/355.02, 379/355.04, 355.08, 355.07, 355.05, 355.01, 379/355.03, 355.09, 356.01, 216.01, 221.11; 455/564
See application file for complete search history.

(56) References Cited

U.S. PATENT DOCUMENTS

| | | | | |
|---|---|---|---|---|
| 5,157,719 A | * | 10/1992 | Waldman | 379/355.05 |
| 5,305,372 A | * | 4/1994 | Tomiyori | 455/564 |
| 5,309,508 A | | 5/1994 | Rosen | |
| 5,311,584 A | * | 5/1994 | Bogart et al. | 379/221.14 |
| 5,588,049 A | * | 12/1996 | Detering et al. | 379/142.04 |
| 5,644,633 A | | 7/1997 | Kaufeld et al. | |
| 5,812,651 A | * | 9/1998 | Kaplan | 379/200 |
| 5,859,896 A | | 1/1999 | Rosen | |
| 5,859,901 A | * | 1/1999 | Brendzel et al. | 379/121.01 |
| 5,917,904 A | * | 6/1999 | Theis | 379/355.08 |
| 6,201,864 B1 | * | 3/2001 | Theis | 379/355.01 |
| 6,292,557 B1 | * | 9/2001 | Gabara | 379/355.08 |
| 6,567,675 B1 | * | 5/2003 | Rosen et al. | 455/564 |
| 6,674,850 B1 | * | 1/2004 | Vu et al. | 379/220.01 |
| 6,870,927 B1 | * | 3/2005 | Theis | 379/355.01 |
| 2003/0165226 A1 | * | 9/2003 | Vu et al. | 379/221.01 |

OTHER PUBLICATIONS

MX Com, Inc Communication Ics 1999 Product Databook, MX Com, Inc., 1998, p. 4-86, Figure 4.

* cited by examiner

Primary Examiner—Binh K. Tieu
(74) Attorney, Agent, or Firm—John L Breckenridge

(57) ABSTRACT

Method and apparatus for an Intelligent Prefix Dialer, eliminating the necessity for manually dialing a local area code as a prefix to a call within the same area code in telephone systems in which such action is a requirement. An Intelligent Prefix Dialer is quiescent and monitors the dialing sequence from the caller's Customer Premise Equipment, CPE, when off-hook condition has been sensed. When the caller wishes to dial seven digits or less of a telephone number, my invention parses a caller defined default prefix, with the abbreviated digits the caller has dialed to form a complete telephone number. The Intelligent Prefix Dialer changes state from quiescent to active and interrupts the call progress to clear the subscriber's telephone line. The Intelligent Prefix Dialer then dials the complete telephone number to successfully complete the call.

The Intelligent Prefix Dialer is also user programable to dial Caller ID Blocking or Caller ID Sending * codes, (i.e., *67 or *82), the Intelligent Prefix Dialer intersperses the area code in the correct position before redialing the number, (i.e., *67NPA-Nxx-xxxx) to successfully complete the call. When required, the Intelligent Prefix Dialer is user programmable to dial 1 plus code access, (i.e. 1NPA-Nxx-xxxx)

Features of the Intelligent Prefix Dialer allow for the seamless, uninterrupted successful completion of dial sequences which a caller may initiate, such as, but not limited to, 411, 911, 0, 1-Nxx-xxxx., and various * codes required by the Central Office for special features subscribed to by the caller.

19 Claims, 14 Drawing Sheets

*Line Interruption Circuit Detailed Configuration*

INTELLIGENT TELEPHONE PREFIX DIALER PSEUDOCODE

Version Beta 3.0

Subroutines
  DISPLAYPREFIX@
 LINEMONITOR@
  MONITORLINE@
  CAPTUREDIGITS@
  CAPOPTIONSTRINGS@
  CAPREFIXSTRING@
  FLASHLINE@
  GETNDX@
  CHECK_FOR_TEN@
  DIALNUMBER@
  PARSEOPTIONS@
  PARSESTRING@

Data

| | | |
|---|---|---|
| | LENGTH | /* length of table*/ |
| | TABLE | /*start of table*/ |
| | SUM | /*sum of digits*/ |
| | COUNT | /*count of digits*/ |
| | TELNO(8) | /*user dialed digits*/ |
| | PREFIX | /*user defined dial prefix*/ |
| | DIALTONE_FLAG | /*Flag to indicate line state */ |
| | | /* On Hook = 0, Off Hook = 1*/ |
| | | /* Line one to Off Hook Line two*/ |
| | DIAL_STRING(10) | /*The reparsed dial string necessary to complete */ |
| | | /* the call*/ |
| | USER_REQUEST_FLAG | /*Flag to initiate user input of prefix code*/ |
| | NDX | /*# Pointer for user TELNO entries |
| | | /*intoDIALSTRING*/ |
| | NUMBER_OF_DIGITS_CAPTURED | /*number of digits received by dtmf receiver before*/ |
| | | /*timeout*/ |
| | ON_HOOK_TIME_COUNTER | /*amount of time that receiver is on hook*/ |
| | BYPASS | /*bypass bit, if set to 1, bypasses flashook 2 and 3*/ |

Figure 6a

Program MAIN

/*Declare and initialize all variables*/

Declare and Intitilize Hardware specific variables for dtmf transceiver and other hardware

| | | | |
|---|---|---|---|
| Dtmf | var | byte | |
| Bypass | var | byte | |
| Dt_flag | var | bit | |
| Dt_det | var | INL.bit2 | /*Detect bit from dtmf receiver*/ |
| Dialtone_flag | var | bit | |
| Number_of_Digits_Captured | var | byte | /*Range index to telno()*/ |
| Digit | var | byte | /*Index of digits to dial by autodialer*/ |
| I | var | word | |
| L | var | byte | |
| K | var | bit | |
| Ndx | var | nib | |

Gosub GETNDX        /*Get ndx from EEPROM*/
For I = 1 to ndx - 1
Get prefix code from EEPROM and place into dial_string(I)
next
GOSUB DISPLAYPREFIX    /*Show the stored dialing prefix*/
CAPDIGITS:
    GOSUB CAPTUREDIGITS    /*Start listening for dial string digits entered by user*/
       If NUMBER_OF_DIGITS_CAPTURED <> (10 – NDX) + 1 then
         goto INHIBITDIAL
       fi GOSUB PARSESTRING        /*Parse the TELNO() into DIAL_STRING()
    Pause 160            /*Time delay before initiating flash hook sequence*/
    GOSUB FLASHLINE    /*First Flash hook*/
    Pause 700            /*Time delay before further action*/
    If BYPASS =1 then GOTO SKIP_FLASHES  /*2$^{nd}$ and 3$^{rd}$ flash only necessary for 3
                      /*way call*/
GOSUB FLASHLINE        /* 2nd Flash hook*/
    Pause 700            /*Time delay before further action*/
GOSUB FLASHLINE        /* 3$^{rd}$ Flash hook*/
    Pause 700            /*Time delay before further action*/

Figure 6b

```
SKIP_FLASHES:
        pause 700                    /*Time delay before initiate redial*/
    GOSUB DIALNUMBER                 /*Dial the number with the required prefix*/
INHIBITDIAL:
      GOSUB LINEMONITOR              /*Stay put until line goes onhook*/
    GOSUB MONITORLINE                /*Stay put until line goes offhook*/

GOTO CAPDIGITS    /*Start listening for digits again*/
```

/*********************************************************************/

SUBROUTINE:LINEMONITOR
LOOPDT1:
    Set DIALTONE_FLAG from (Telephone Line) /*0 is ONHOOK, 1 is OFFHOOK*/
        IF DIALTONE_FLAG indicates OFFHOOK then GOTO LOOPDT1
    Return

/*********************************************************************/

/*********************************************************************/

SUBROUTINE:MONITORLINE
    Initialize ON_HOOK_TIME_COUNTER to Zero
LOOPDT2:
    Set DIALTONE_FLAG from (Telephone Line) /*0 is ONHOOK, 1 is OFFHOOK*/
        IF DIALTONE_FLAG indicates ONHOOK then
          Do
            Increment ON_HOOK_TIME_COUNTER
            GOTO LOOPDT2
          Done
        fi
        IF ON_HOOK_TIME_COUNTER > 800 then set BYPASS to 1
        fi
    Return
/*********************************************************************/

Figure 6c

```
/*********************************************************************/
SUBROUTINE: CAPTUREDIGITS
CAPTUREDIGITS:
        SETUP dtmf hardware for dtmf READ
        For I = 1 to 1700   /*Initialize Interdigit count down timer*/
          Get DIALTONE_FLAG from (Telephone Line) /*If not still OFFHOOK then EXIT to MAIN*/
          If DIALTONE_FLAG = 0 then GOTO MAIN
                fi
          POLL for dtmf tone from (DTMF RECEIVE CHIP)
           If tone not detected then NEXT I        /*Increment Interdigit count down timer*/
           else
             Increment NUMBER_OF_DIGITS_CAPTURED
             If NUMBER_OF_DIGITS_CAPTURED > (10 – NDX) + 1 then GOTO MAIN
                        /*user dialed more than */
                        /*prefix digits plus user digits and does not need help here */
             READ dtmf tone into variable DTMF
             TELNO(NUMBER_OF_DIGITS_CAPTURED) = DTMF
         NEXT I
                /*Interdigit Timer has timed out, Check for number of digits received*/
        IF NUMBER_OF_DIGITS_CAPTURED < (10 – NDX) + 1 then
           Do
              If telno(1) = 12 and telno(2) = 1 then Do                             /*User has requested to input options*/
                     Gosub PARSEOPTIONS
                     Goto MAIN                   /*Initialize with new user options*/
                  Done
              Set NUMBER_OF_DIGITS_CAPTURED = 0
           Done
        Return
/*********************************************************************/
SUBROUTINE: PARSESTRING
        For j = NDX to 10
           DIAL_STRING(j) = TELNO(j – (NDX – 1))
        Next j
Return              /***************/
```

Figure 6d

```
SUBROUTINE: FLASHLINE
        Go ONHOOK
        Pause 600 msec              '600 milliseconds, nominal, can be between 400 and
                                    '700ms
        Go OFFHOOK
    Return
/****************************************************************/
/****************************************************************/
SUBROUTINE: DIALNUMBER
    IF PRIVACY_BIT = 1 then
      Do
        DTMFOUT(*67)            /*Dial the Caller ID Block Code */
      Done
    IF PRIVACY_BIT = 0 then
      Do
        DTMFOUT(*82)            /*Dial the Caller ID Send Code*/
      Done
    IF ONE_PLUS_BIT = 1 then
      Do
        DTMFOUT(1)              /*Dial 1 before the area code, etc*/
      Done
    For DIGIT = 1 to 10
        DTMFOUT(DIALSTRING(DIGIT)) /*Dial the prefix code and the rest of the
                                    /*phone number*/
    Return
/****************************************************************/
/****************************************************************/
SUBROUTINE: PARSEOPTIONS
        Write to DisplayDevice("PRIVACY?: Y/N) /*Prompt for user to turn Call ID Block ON or */
                                    /*OFF*/
        Gosub CAPOPTIONSTRINGS      /*Get user input*/
        Write user input to EEPROM
        Read user input from EEPROM
        Write user input from EEPROM to DisplayDevice /*User selection confirmed on */
                                    /*DisplayDevice*/
```

Figure 6e

Write to DisplayDevice("1 PLUS ON?: Y/N) /*Prompt for user to turn 1 PLUS Dialing
                                                    /*ON or OFF*/
    Gosub CAPOPTIONSTRINGS      /*Get user input*/
    Write user input to EEPROM
    Read user input from EEPROM
    Write user input from EEPROM to DisplayDevice /*User selection confirmed on*/
                                                    /*DisplayDevice*/
    Write to DisplayDevice("ENTER PREFIX# ) /*Prompt for user to enter dialing prefix*/
    Gosub CAPREFIXSTRING        /*Get user input of dialing prefix*/
    Write user input to EEPROM
    While user input from EEPROM <> 12
        Do
            Read user input from EEPROM
            Gosub CHECK_FOR_TEN
            Write user input from EEPROM to DisplayDevice /*User entry confirmed on*/
                                                    /*DisplayDevice*/
  Done
        Return
/****************************************************************/

SUBROUTINE: DISPLAYPREFIX
        READ PrefixData from EEPROM
        WRITE PrefixData from EEPROM to DisplayDevice
Return
/****************************************************************/

SUBROUTINE: CAPOPTIONSTRINGS
        For I =1 to 1900       /* Time out if no user input*/
            When data present from DTMFreceiver
        Do
                READ data from DTMFreceiver into option_bit
                Return
            Done
        Next
Return
/****************************************************************/

Figure 6f

SUBROUTINE: CAPREFIXSTRING
    Mu = 0
    For I =1 to 1900        /* Time out if no user input*/
      When data present from DTMFreceiver
    Do
        Mu = mu + 1
        READ data from DTMFreceiver into telno(mu)
        If telno(mu) = 12 or mu > 7 then
          Return
        fi
    done
    Next
    Return
/**********************************************************************/
SUBROUTINE: GETNDX
for i = 1 to 7
  read from start of prefix data from EEPROM into digit
  if digit = 12 then ret_ndx
next
return
ret_ndx:
ndx = I
return
/**********************************************************************/
SUBROUTINE: CHECK_FOR_TEN
if telno(i) = 10 then zeroit
return
zeroit:
telno(i) = 0                        /*Format output for DisplayDevice*/
return
/**********************************************************************/

Programmer Application Notes:

1. Actual programming language used was Parallax, Inc. PBASIC
2. Processor used was the Parallax, Inc. BASIC Stamp II, BS2-IC

Figure 6g

3. The Pause instruction argument is in milliseconds
4. The processor clock speed is approximately 20MHZ
5. The PBASIC interpreter executes approximately 3000 instructions per second, i.e. 0.3 milliseconds per instruction. Use the 0.3 milliseconds/instruction value to calculate timeouts and delays that are implemented using loops.
6. Contact the inventor for future development and application notes.

Figure 6h

METHOD AND APPARATUS FOR AN INTELLIGENT TELEPHONE PREFIX DIALER

1.1. RELATED U.S. PATENT DOCUMENTS 5,859,896
5157719
5309508

1.2. BACKGROUND—FIELD OF THE INVENTION

The invention relates to a method and apparatus for dialing a predetermined telephone number prefix, such as an area code, along with the suffix, comprising the complete telephone number for successfully completing calls where such a requirement exists in the Central Office used by the calling party, and for selectively activating said method and apparatus.

1.3. BACKGROUND—DESCRIPTION OF RELATED ART

Local telephone calls have, for many years, been effected by dialing a seven digit code. Most recently, however, the demand for telephone number assignments has increased dramatically due to subscribers' use of telephone lines for fax machines, and the internet as well as separate voice lines. New housing developments have also increased the demand for telephone number assignments.

One technological advance which promises to alleviate this problem for a number of years is to require a calling party to dial the area code of a called party even when the two parties are within a common area code. Thus, one would be required to dial a ten digit code even if the called party is next door. It will be readily apparent that this change is highly inconvenient to many persons who wish to continue the use of the traditional seven digit dialing for local calls. Accordingly it will be understood that a method and apparatus which, in such a contemplated modified telephone dialing system, permits the ongoing use of standard seven digit dialing for routine local calls would be highly desirable, and it is to this end that the present invention is directed.

1.4. OBJECTS AND ADVANTAGES

"Here's some scary math: Mark Cooper, research director of the Consumer Federation of America, estimates 10-digit dialing adds two seconds of dial time of each call made, increases error rates by 43 percent, and could cost telephone customers up to $22 million annually in lost time."

"Fortunately, experience doesn't support such dire predictions; error rates dropped dramatically after only one day of 10-digit dialing in Maryland. And at US WEST, we're committed to helping customers make the transition with the greatest possible ease. Here, each switch to 10-digit local dialing takes our employees nearly a year of planning and preparation." . . . US West Observations.

The object of my invention is to allow subscribers to continue their 7 digit dialing habits. Notwithstanding the US West Observation that subscribers adjust to 10 digit dialing and reduce error rates, 10 digit dialing is still a hassle. Error rates may have been reduced, but consumers would rather not use the additional time and mental processing to formulate a 10 digit dial sequence, especially if there is a technologically feasible alternative. While there is already a solution for frequently dialed numbers, stored automatic dialing either from the subscriber's handset or the Central Office switch, (Speed dialing options), there currently is no safe, fool-proof solution that contemplates implementation either in the subscriber's equipment or the Central Office equipment for less frequently dialed numbers, such as a number the subscriber dials from a telephone directory.

Most subscribers have a pattern of dialing that presupposes using a specific Numbering Plan Area number, (NPA) more frequently than any other overlayed NPA number. With my invention a subscriber designated NPA number can be stored for use with any seven digit number the subscriber dials. Moreover, if desired by the subscriber, an NPA-Nxx number may be stored in my invention, thus fascilitating xxxx, 4 digit dialing by the subscriber for call completion.

It is therefore an object of the invention to provide a method and apparatus that is responsive to the 7 or less digit number dialed by the calling party, and eliminate the necessity for the calling party to dial any predetermined code, such as an area code, prior to entering the called party's local telephone number.

A further object of the invention is to provide a method and apparatus which includes the feature of having the predetermined code being programmable by the subscriber.

It is a more specific object of the invention to provide a method and apparatus of dialing the predetermined code plus the receiving party's telephone number after the calling party dials a seven or less than seven digit sequence of the receiving party. In another aspect, it is an object of the invention to provide such method and apparatus which includes a feature to automatically remain quiescent when appropriate such as when a long distance call is dialed or when 911, 411 or any other special dial string that does not require dialing assistance from the Intelligent Telephone Prefix Dialer.

1.5. BRIEF SUMMARY OF THE INVENTION

Briefly the objects as described in OBJECTS OF THE INVENTION, section 1.4. and other objects, are achieved by a method and apparatus in which a re-dialer is selectively activated and transmits a local area code or other required code along with the subscriber[1] entered dial string on the caller's telephone line when the intelligent prefix dialer algorithmically determines that its activity is required to successfully complete the address of the called party. Thus the calling subscriber may dial 7 digits to complete the call, and when the subscriber has entered more than three digits into the intelligent prefix dialer as the pre-stored prefix code, the subscriber may dial less than 7 digits to complete the call.

[1] The term "subscriber" and the term "calling party" are used interchangeably in this document

1.6. DESCRIPTION OF THE DRAWINGS, FIGS. 1 THROUGH 6

FIG. 6 is a pseudo code representation of the programmed instructions required to effect the functionality as described in the Detailed Description of the Invention.

1.7. DETAILED DESCRIPTION OF THE INVENTION, PREFERRED EMBODIMENT(S)

Figure 1:
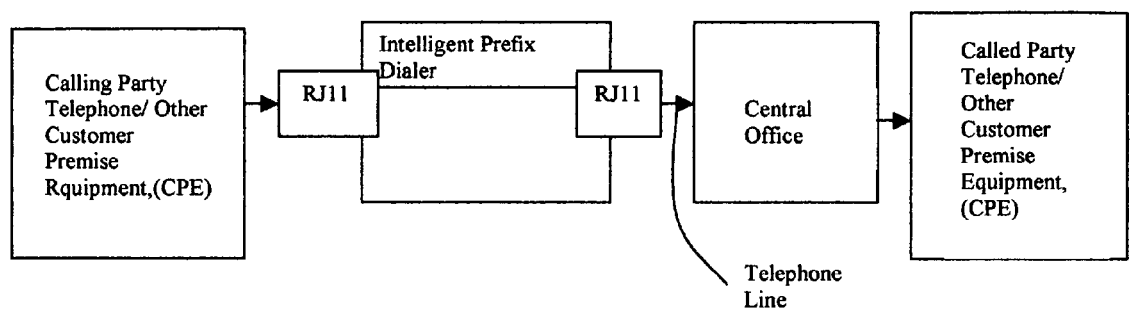
FIG. 1 illustrates the connection between the calling subscriber's telephone or other equipment to the intelligent prefix dialer, the connection of the Intelligent prefix dialer to the telephone line at the subscriber's location, and the continuation of the telephone line to the central office, ultimately connecting to the called party's telephone or other equipment.

Referring to FIG. 1 for a description of a representative environment, note that the standalone embodiment of the intelligent telephone prefix dialer presupposes a standard telephone interface between the telephone line, the intelligent telephone prefix dialer, and the subscriber's telephone or other subscriber equipment.

Figure 2A:
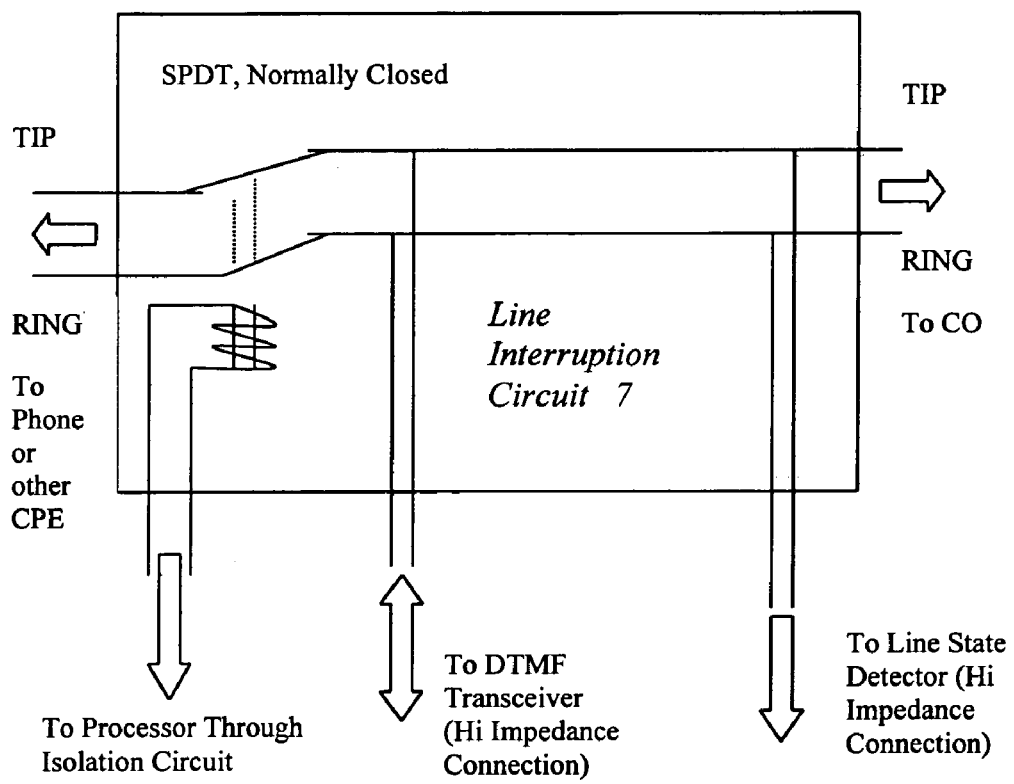
FIG. 2a is a schematic block diagram detailing the line interruption connection, the dtmf transceiver connection, and the line state detector connection to the subscriber's incoming telephone line. The schematic of FIG. 2a also shows the line interruption control circuit in block diagram format.
Figure 2B:
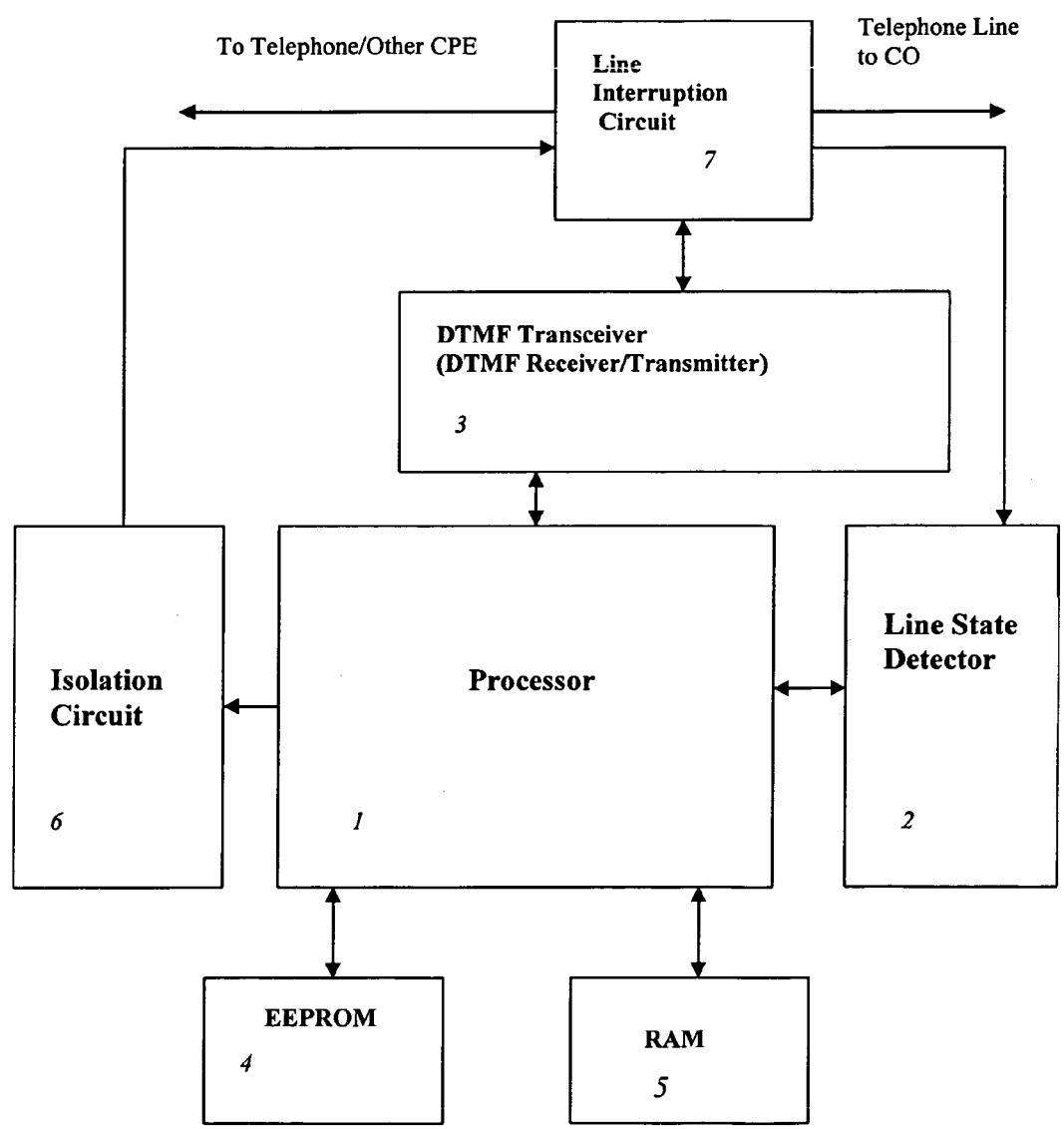
FIG. 2b is a schematic block diagram of an exemplary embodiment of the inventive apparatus.

As shown in FIGS. 2a and 2b, it should be understood that absent a processor initiated line interruption, the normally closed configuration of line interruption circuit 7 allows a user to initiate a dial string on the telephone network contemporaneously with processing instructions being executed in the processor 1.

In FIG. 2b the line interruption circuit 7 is provided to create a hook switch flash upon a software request from the processor 1. The requisite control signal from the processor is transmitted through the isolation circuit 6. The isolation circuit is provided to isolate currents and voltages typically found in the type of relay that would be used in the line interruption circuit from the processor hardware, so that a much smaller voltage and or current may be used to effect relay activation at the line interruption circuit. Isolation circuit methods may vary and are known and understood by those skilled in the art.

As shown in FIG. 2a, the output of the dtmf transmitter 3, and the input of the dtmf receiver 3, are both connected to the tip and ring of the subscriber's telephone line in such a manner, (high impedance connection), as to not interfere with the telephone line, either looking towards the Central Office, or back to the subscriber's other Customer Premise Equipment, hereinafter, CPE. The processor 1 controls the dtmf transmitter to send dtmf data onto the subscriber's telephone line. The processor 1 controls the dtmf receiver to listen for dtmf data on the subscriber's telephone line.

In a similar fashion, the line state detector 2 input is connected to the tip and ring of the subscriber's telephone line, (high impedance connection). The line state detector 2 output is connected to the processor 1.

EEPROM 4 is connected to the processor for communication of non-volatile data such as the predefined dial prefix, to the processor, and the retention of programmed instructions regardless of power cycles or other dynamic environmental conditions which may be encountered by the inventive apparatus.

RAM 5 is connected to the processor for a scratchpad function to hold transient variable data such as the telephone number dialed by the subscriber.

Referring to FIGS. 6a–6h, the pseudo-code provides the methods required by the inventive apparatus to activate the components outlined in FIGS. 2a and 2b. Beginning with processor initialization, the required variable lengths and values are set upon power up of the intelligent telephone prefix dialer.

Referring to FIGS. 6a–6h for programmed instruction references and FIG. 2b for hardware component references, when the USER_REQUEST_FLAG is set, processing control transfers to the PARSEOPTIONS subroutine. All items and prompts displayed at the request of PARSEOPTIONS are done through subroutine DISPLAYPREFIX. The PARSEOPTIONS subroutine prompts the user if privacy is desired. If the user responds "Y" for yes then a flag is written to EEPROM which will be used to transmit a *67 as part of the user defined prefix dial string. If the user responds "N" for no then a flag is written to EEPROM which will be used to transmit a *82 as part of the user defined prefix dial string. After the user has responded, or if the user has not responded within a specified time period, The PARSEOPTIONS subroutine will display whether privacy is confirmed on or off.

Similarly PARSEOPTIONS will prompt whether the user desires "1+" dialing or not. If the user selects "1+" dialing, a dtmf 1 will be interspersed between the *67/*82 sequence and the rest of the predetermined prefix dial string.

Next PARSEOPTIONS prompts the user to enter a default dialing prefix and responds by writing this prefix into EEPROM. The default dialing prefix is then displayed to the user after the user has entered the dialing prefix or if he/she/ has not entered a dialing prefix within a specified time period, whatever default dialing prefix which was previously stored is displayed. PARSEOPTIONS then returns processing control to the MAIN processing routine.

Referring to FIG. 6 for programmed instruction references and FIG. 2b for hardware component references, subroutines LINEMONITOR, and MONITORLINE use the output of the line state detector, FIG. 2b 2, to trigger from on-hook line condition and off-hook line conditions, respectively. MONITORLINE also counts the amount of time that the line condition is on-hook, if the amount of time is above a threshold value then the on-hook time is flagged, BYPASS set to 1, to not be a flash hook, otherwise the line condition is a flash. LINEMONITOR is used to inhibit operations of the inventive apparatus until the line condition goes on-hook. This feature provides the functionality of permitting the subscriber to send dtmf digits over the network without interference from the inventive apparatus such as when the subscriber is interfacing with a remote automated attendant.

Referring to FIGS. 6a–6h for programmed instruction references and FIG. 2b for hardware component references, subroutine GETNDX reads the prefix data in EEPROM to determine the number of digits in the default prefix dial string. Sets an index appropriately then returns. As is shown in FIG. 6 the MAIN routine places the prefix code into the least significant part of the string to be dialed, then starts listening for subscriber dialed digits via the dtmf receiver by transferring control to subroutine CAPTUREDIGITS.

As shown in FIGS. 6a–6h the CAPTUREDIGITS routine inhibits further processing during the progress of the call if the number of subscriber digits captured does not equal (10−NDX) +1, NDX being 1 greater than the number of default prefix digits stored in EEPROM. The effect of this processing gives the subscriber control over when inventive apparatus will dial for the subscriber, for example, if the prefix is a three digit area code, the inventive apparatus will intervene to complete the call only if the subscriber has dialed a 7 digit number. When CAPTUREDIGITS has captured the subscriber digits and timed out, it returns to MAIN. If the required number of digits have been captured, processing continues to PARSESTRING.

Referring to FIGS. 6a–6h for programmed instruction references and FIG. 2b for hardware component references, subroutine PARSESTRING forms a resultant digit sequence by parsing together the default dial prefix and the dial string dialed by the subscriber, then returns to MAIN Referring to FIGS. 6a–6h for programmed instruction references and FIG. 2b for hardware component references, After PARSESTRING, the MAIN routine pauses for a predetermined amount of time then proceeds to effect a hook switch flash via a control signal to the line interruption circuit by calling subroutine FLASHLINE. Upon return MAIN pauses for a predetermined period of time then effects two more flash hooks if the subscriber has interrupted call progress to dial another number for three way calling activation, then processing continues; if the subscriber has not interrupted call progress to dial another number for three way calling activation, then two additional hook switch flashes are bypassed and processing continues.

Referring to FIGS. 6a–6h for programmed instruction references and FIG. 2b for hardware component references, MAIN transfers control to subroutine DIALNUMBER in order to dial the resultant digit sequence containing the complete telephone number with the required prefix by means of the dtmf transmitter. Subroutine DIALNUMBER first dials the Caller ID Block Code if the PRIVACY_BIT is set or DIALNUMBER dials the Caller ID Send Code if the PRIVACY_BIT is not set. Next, if the ONE_PLUS_BIT is set then DIALNUMBER dials a 1. Next, the default prefix code and the rest of the telephone number as parsed in PARSESTRING is dialed by DIALNUMBER to complete the call. DIALNUMBER then returns After processing returns from DIALNUMBER, the inventive apparatus remains quiescent until the subscriber is ready to dial another number.

ISDN and Analog Telephone Embodiments

Figure 3:
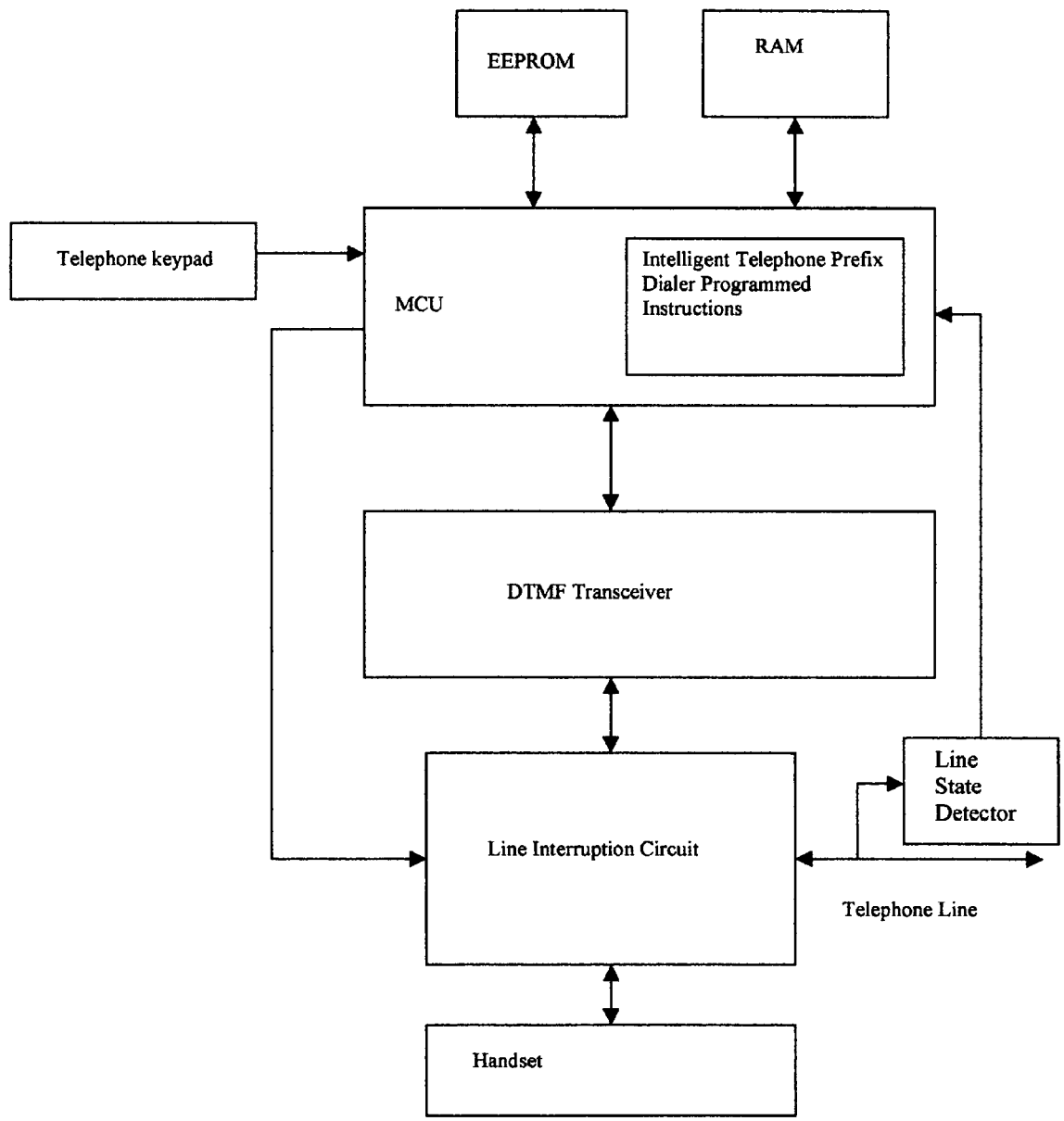
FIG. 3 is a schematic block diagram of an alternative embodiment of the inventive apparatus, integrated into a typical POTS, analog telephone set.
Figure 4:
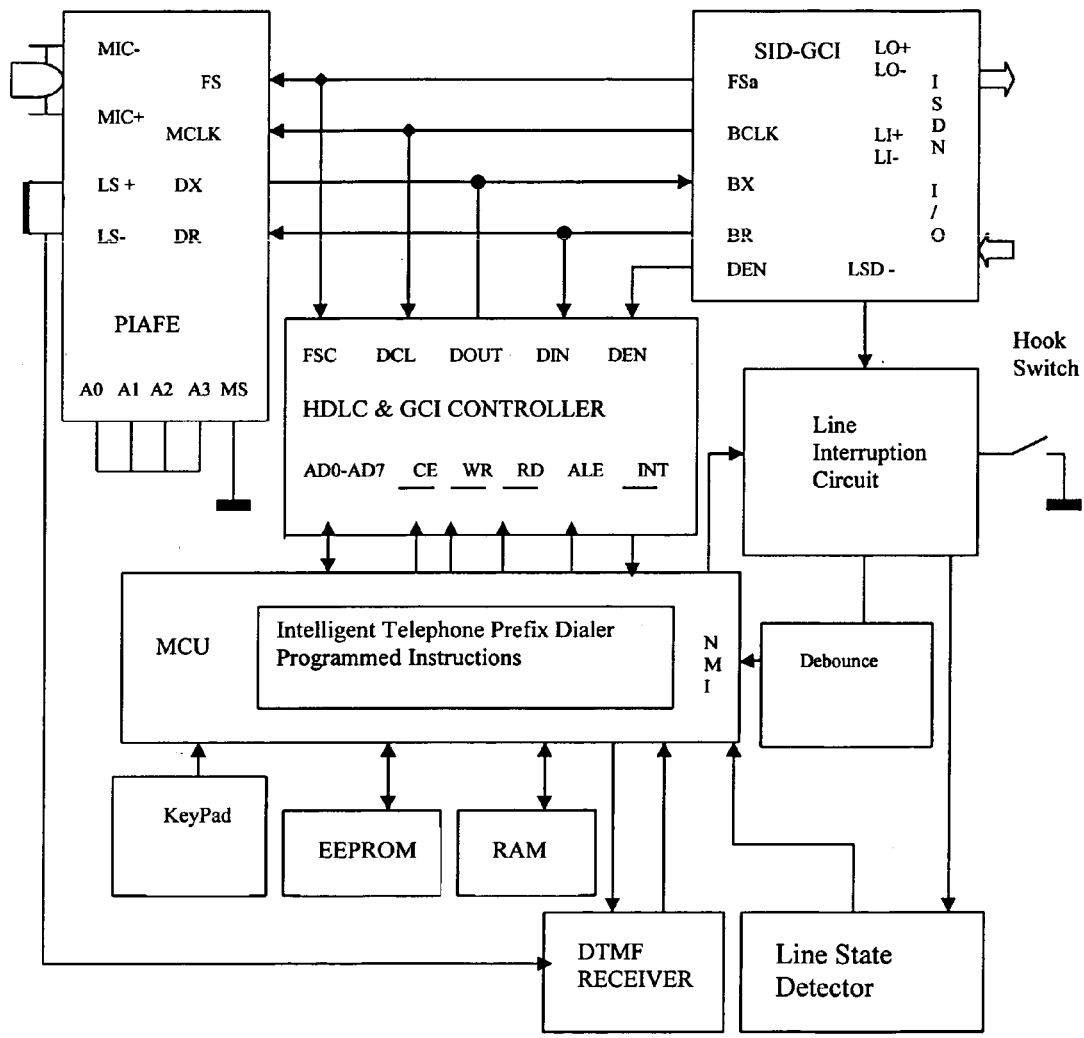
FIG. 4 is a schematic bloc diagram of an alternative embodiment of the inventive apparatus, integrated into a typical ISDN telephone set.

As shown in FIG. 3 and FIG. 4 the hardware and programmed instruction components detailed in FIGS. 2a, 2b, and 6a–6h may be integrated into an ISDN telephone set or an Analogue telephone set, and such implementation is within the scope of the principles described in this DETAILED DESCRIPTION OF THE INVENTION.

Advanced Intelligent Network (AIN) Embodiment

Figure 5:
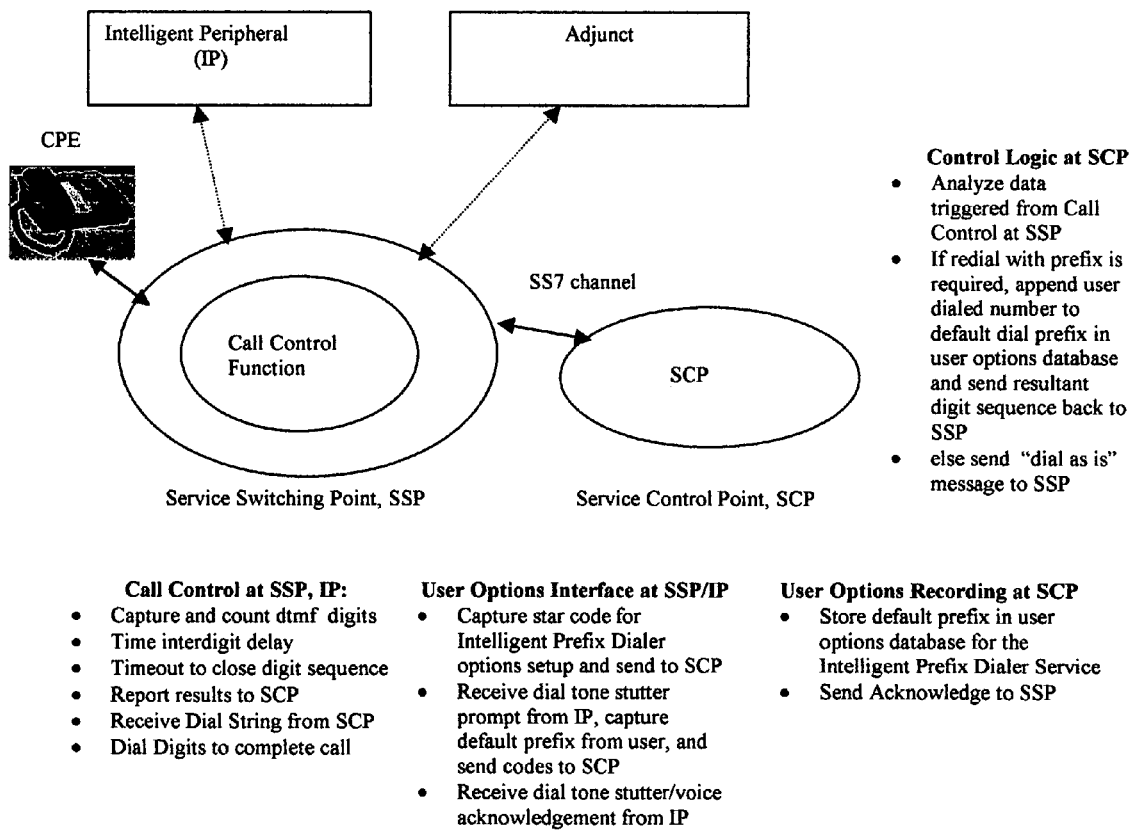
FIG. 5 is a schematic block diagram representing a further embodiment of the inventive method within the Service Provider's Advanced Intelligent Network, (AIN), equipment.

Referring to FIG. 5 for methodology references, and FIGS. 6a–6h for programmed instruction references, the intelligent telephone prefix dialer method may also be implemented in an Advanced Intelligent Network (AIN) environment. Background information related to AIN architecture is incorporated herein by reference; see "Advanced Intelligent Network Release 1 Network and Operations Plan", Special Report, SR-NPL-001623, Issue1, June 1990, Bell Communications Research, also see "Advanced IntelligentNetworks—now a reality" by C. D. Sharp and K. Clegg, Electronics & Communication Engineering Journal, June 1994.

Note that the Service Switching Point (SSP) in FIG. 5 by definition has AIN Switch Capabilities. The Intelligent Peripheral (IP) and the Adjunct are shown for completeness of detail in that my invention may be implemented using the IP and the Adjunct in lieu of exclusive implementation in the SSP and SCP. The Adjunct is functionally equivalent to the SCP but uses a high speed communications channel separate and distinct from the SS7 channel communications between the SCP and the SSP.

The IP may be used to set up sophisticated interaction, e.g. voice interaction, between the subscriber and my invention, in lieu of the stutter dial tone communication shown in FIG. 5. The IP may also be used for the capturing and counting of subscriber dtmf digits in lieu of that functionality being implemented at the SSP.

The user options interface at either the SSP or the IP is responsive to a * code sent from the subscriber indicating that the subscriber wishes to store a default prefix dial string in the user options database in the SCP. Upon dial tone stutter initiated by the IP, the subscriber enters the desired prefix code followed by the # key. These digits are captured by the IP and then forwarded to the user options database via the SS7 channel between the SSP and the SCP.

Confirmation of the default dialing prefix is provided by a voice announcement to the subscriber over the telephone network initiated by the IP.

A variable containing the specified number of digits equaling; (The total number of digits required to complete the call—Number of default dialing prefix digits entered by user) is transmitted from the SSP to the SCP. This variable is recorded in the user options database. The control logic of my invention in the SCP will retrieve the variable containing the specified number of digits to determine whether to activate dialing after the digit capture logic of my invention has timed out.

Once the default dial prefix has been stored in the user options database in the SCP, the intelligent dialing functionality of my invention is prepared for activation. When the subscriber picks up the telephone, the SSP transmits a series of triggers to the SCP indicating call progress, including off-hook line condition, flash-hook line condition, and on-hook line condition. The SCP determines whether the intelligent dialing feature is present in the current subscriber's AIN features list. If yes, the SCP then determines that the intelligent dialing function is to be activated in the dtmf listen mode, and transmits the request to the SSP which is forwarded by the SSP to the IP.

Subsequently, the IP is tasked to capture, count, and timeout dtmf digits sent by the subscriber, while inhibiting those digits from going to the switch, (SSP). When digit capturing by the IP has timed out, such as when the subscriber finishes dialing a number and is no longer entering digits, the IP communicates the subscriber's dialing sequence to the SSP with instructions for the SSP to not complete the call at this time, but to forward the subscriber's dialing sequence to the SCP.

Upon receipt of the subscriber's dialing sequence from the SSP via the SS7 channel, my inventive method in the SCP counts the digits. If the number of digits dialed by the subscriber does not equal said specified number of digits, supra, the SCP transmits instructions back to the SSP to complete the call only with the subscriber's dialing sequence. If the number of digits dialed by the subscriber equals said specified number of digits, supra, the SCP, by means of the control logic of my inventive method, appends the digits dialed by the subscriber to said default dial prefix digits, supra, and temporarily stores the resultant digit sequence. The SCP then transmits the resultant digit sequence back to the SSP, with instructions for the SSP to complete the call using said resultant digit sequence. In accordance with said instructions from the SCP, the call is completed by the SSP. My inventive method then remains quiescent until the subscriber initiates a flash or other hook switch transition.

1.8. SUMMARY, RAMIFICATIONS, AND SCOPE

Briefly, these and other objects of the invention are achieved by an Intelligent Telephone Prefix Dialer which listens for the dial string initiated by the subscriber on the subsriber's telephone line when an off-hook condition is sensed; e.g., when the subscriber picks up the telephone handset, or during call progress when a switch hook flash is detected. Said Intelligent Telephone Prefix Dialer then algorithmically determines whether the subscriber initiated dial string is incomplete If the subscriber initiated dial string was determined to be incomplete, my invention parses the default prefix dial string with the subscriber initiated dial string to form a complete telephone address. The inventive method or apparatus then places the complete telephone address on to the telephone network for call completion. Thus, the caller can dial an abbreviated number of digits to successfully complete the call.

In order to provide for the selective dialing of long distance, or other dial strings which do not require the Nxx-xxxx dial sequence for call completion, the Intelligent Prefix Dialer automatically inhibits itself from interrupting the subscriber initiated dial sequence thus allowing for successful call completion without intervention from the Intelligent Telephone Prefix Dialer.

I claim:

1. A telephone dialing method for call completion comprising:
    allowing a subscriber to enter a default dialing prefix;
    storing the default dialing prefix in EEPROM;
    allowing the subscriber to initiate a dial string on the telephone network;
    monitoring and storing the subscriber initiated dial string contemporaneously with the allowing the subscriber to initiate the dial string on the telephone network;
    determining whether the subscriber initiated dial string has a required number of incomplete digits related to a number of digits of the default dialing prefix, the determining being done contemporaneously with the allowing the user to initiate a dial string on the telephone network;
    inhibiting further processing until a next call if the user initiated dial string was determined to be unequal to the required number of incomplete digits;
    parsing together the default dialing prefix stored in EEPROM and the subscriber initiated dial string only if the subscriber initiated dial string was determined to have the required number of incomplete digits related to the number of digits of the default dialing prefix, wherein a complete telephone number with the default dialing prefix is created;
    effecting at least one hook switch flash to achieve telephone line interruption if the user initiated dial string was determined to have the required number of incomplete digits related to the number of digits of the default dialing prefix; and,
    placing, subsequent to effecting the at least one hook switch flash, the complete telephone number, which comprises the default dialing prefix and the subscriber initiated dial string, on the telephone network for call completion.

2. The method of claim 1 wherein the monitoring further comprises listening for DTMF data representing the subscriber initiated dial string.

3. The method of claim 2 wherein the storing further comprises storing only the DTMF data that occurs before timing out of the monitoring.

4. The method of claim 3 wherein the determining further comprises subtracting a first number of digits captured in the subscriber initiated dial string from a pre-determined number wherein if the result is equal to a second number of digits representing the number of digits contained in the default dialing prefix, then the subscriber initiated dial string has the required number of incomplete digits.

5. The method of claim 1 wherein the parsing further comprises adding a caller id block code.

6. The method of claim 1 wherein the parsing further comprises adding a caller id send code.

7. The method of claim 1 wherein the parsing further comprises adding a 1+dial code.

8. In an apparatus for telephone call completion, the apparatus for telephone call completion comprising a computing device, a program storage device readable by machine, tangibly embodying a program of instructions executable by the machine to perform method steps for call completion, said method steps comprising:
    allowing a subscriber to enter a default dialing prefix;
    storing the default dialing prefix in EEPROM;
    allowing the subscriber to initiate a dial string on the telephone network;
    monitoring and storing the subscriber initiated dial string;
    determining whether the subscriber initiated dial string is a required number of incomplete digits related to a number of digits of the default dialing prefix, the step of determining being done contemporaneously with the step of allowing the user to initiate a dial string on the telephone network;
    inhibiting further processing until a next call if the user initiated dial string was determined to be unequal to the required number of incomplete digits;
    parsing together the default dialing prefix stored in EEPROM and the subscriber initiated dial string only if the subscriber initiated dial string was determined to have the required number of incomplete digits related to the of digits of the default dialing prefix, wherein a complete telephone number with the default dialing prefix is created;
    effecting at least one hook switch flash to achieve telephone line interruption if the user initiated dial string was determined to have the required number of incomplete digits related to the number of digits of the default dialing prefix; and,
    placing, subsequent to the step of effecting the at least one hook switch flash, the complete telephone number, which comprises the default dialing prefix and the subscriber initiated dial string, on the telephone network for call completion.

9. The method of claim 8 wherein the monitoring further comprises listening for DTMF data representing the subscriber initiated dial string.

10. The method of claim 9 wherein the storing further comprises storing only the DTMF data that occurs before timing out of the monitoring.

11. The method of claim 10 wherein the determining further comprises subtracting a first number of digits captured in the subscriber initiated dial string from a predetermined number wherein if the result is equal to a second number of digits representing the number of digits contained in the default dial prefix, then the subscriber initiated dial string has the required number of incomplete digits.

12. The method of claim 8 wherein the parsing further comprises adding a caller id block code.

13. The method of claim 8 wherein the parsing further comprises adding a caller id send code.

14. The method of claim 8 wherein the parsing further comprises adding a 1+dial code.

15. An apparatus for telephone call completion, comprising:

means for allowing a user to define a default dialing prefix;
  means for notifying the user of the default dialing prefix;
  means for allowing the subscriber to initiate a dial string on the telephone network;
  means for monitoring and storing a subscriber initiated dial string;
  means for determining contemporaneously with the subscriber initiating a dial string on the telephone network whether the subscriber initiated dial string has a required number of incomplete digits related to a number of digits of the default dialing prefix;
  means for inhibiting further processing until a next call if the user initiated dial string was determined to be unequal to the required number of incomplete digits;
  means for parsing together the default dialing prefix and the subscriber initiated dial string only if the subscriber initiated dial string was determined to have the required number of incomplete digits related to the number of digits of the default dialing prefix, wherein a complete telephone number with the default dialing prefix is created;
  means for effecting at least one hook switch flash before placing the complete telephone number, which comprises the default dial prefix and the subscriber initiated dial string, on the telephone network for call completion.

16. The apparatus of claim 15 wherein the means for determining further comprises means for subtracting a first number of digits captured in the subscriber initiated dial string from a pre-determined number wherein if the result is equal to a second number of digits representing the number of digits contained in the default dial prefix, then the subscriber initiated dial string is incomplete.

17. The apparatus of claim 15 wherein the means for parsing further comprises means for adding a caller id block code.

18. The apparatus of claim 15 wherein the means for parsing further comprises means for adding a caller id send code.

19. The apparatus of claim 15 wherein the means for parsing further comprises means for adding a 1+dial code.

* * * * *

UNITED STATES PATENT AND TRADEMARK OFFICE
CERTIFICATE OF CORRECTION

| | | |
|---|---|---|
| PATENT NO. | : 7,113,585 B1 | Page 1 of 1 |
| APPLICATION NO. | : 09/525566 | |
| DATED | : September 26, 2006 | |
| INVENTOR(S) | : Breckenridge | |

It is certified that error appears in the above-identified patent and that said Letters Patent is hereby corrected as shown below:

In the Specification

Col. 1, lines 9-12 RELATED PATENT DOCUMENTS: delete the entries "'5,859,896', '5157719', '5309508'" and substitute a single entry '8,374,335'

Col. 6, line 29: replace '--' with a '-'

Signed and Sealed this
Twenty-second Day of October, 2013

Teresa Stanek Rea
*Deputy Director of the United States Patent and Trademark Office*